United States Patent [19]

Yamada et al.

[11] Patent Number: 4,907,194
[45] Date of Patent: * Mar. 6, 1990

[54] STRING COMPARATOR FOR SEARCHING FOR REFERENCE CHARACTER STRING OF ARBITRARY LENGTH

[75] Inventors: Hachiro Yamada; Kousuke Takahashi, both of Tokyo, Japan

[73] Assignee: NEC Corporation, Tokyo, Japan

[*] Notice: The portion of the term of this patent subsequent to Jul. 5, 2005 has been disclaimed.

[21] Appl. No.: 811,073

[22] Filed: Dec. 19, 1985

[30] Foreign Application Priority Data

Dec. 19, 1984 [JP] Japan .................. 59-267837

[51] Int. Cl.$^4$ ............................. G11C 15/00
[52] U.S. Cl. .................. 365/49; 365/189.07; 365/189.08; 364/947.2; 364/956.1; 364/900
[58] Field of Search ............ 365/49, 189, 230, 189.07, 365/230.03, 189.08; 364/200 MS File, 900 MS File

[56] References Cited

U.S. PATENT DOCUMENTS

| 3,257,646 | 6/1966 | Roth | 364/900 |
| 3,448,436 | 6/1969 | Machol, Jr. | 364/900 |
| 4,384,325 | 5/1983 | Slechta, Jr. et al. | 364/200 |
| 4,499,535 | 2/1985 | Bachman et al. | 364/200 |
| 4,499,553 | 2/1985 | Dickinson et al. | 364/900 |
| 4,509,137 | 4/1985 | Yoshida | 364/900 |
| 4,755,974 | 7/1988 | Yamada et al. | 365/189 |

FOREIGN PATENT DOCUMENTS 0138077  8/1982  Japan .................. 365/49

Primary Examiner—Glenn A. Gossage
Attorney, Agent, or Firm—Sughrue, Mion, Zinn, Macpeak & Seas

[57] ABSTRACT

A string comparator is provided for searching the address of a stored string having substantially the same content as that of an input reference string. This comparator comprises a memory including a number of memory cells arranged in a matrix form having a plurality of rows and a plurality of columns. Each string is stored in the memory in such a manner that the row position of each of the memory cells corresponds to the content of a stored string and the column position of each of the memory cells corresponds to the address of the stored string. A row selector is coupled to the memory for selecting one row of the memory cell matrix corresponding to the content of the input reference string to be compared, so that the content of the memory cells belonging to the row selected by the row selector is read out.

33 Claims, 9 Drawing Sheets

Fig. 10

Magnetic _bububle_ _memories_ are non-mechanical solid state file _memories_. They are used in electronic switching systems and spacecraft, because of their excellent endurance and environmental tolerance. In the future, they will be used as built-in compact file such as personal computers. - - - - - - - - - -

STRING COMPARATOR FOR SEARCHING FOR REFERENCE CHARACTER STRING OF ARBITRARY LENGTH

FIELD OF INVENTION

The present invention relates to a string comparator which is used as a component in an information processing system, and more specifically, to a string comparator for extracting designated strings from a long original text composed of many strings.

DESCRIPTION OF RELATED ART

String comparators have been used for a variety of applications such as extraction of specific sequences in pattern recognition systems, extraction of key words from texts made up in word-processors, a support for translation among human languages, decoding of coded correspondences, construction of non-structural data base with pictures, images, texts and so on. In other words, the string comparators are widely used for such "intelligent" information processing.

In the prior art, string comparison has been carried out by sequential program processing by means of a general purpose computer. Therefore, it takes an enormous amount of time for the processing, and as a consequence, such string comparison has been limited to small-scale processing. For example, for the detection of a string of m characters in a text consisting of n characters, comparisons must be carried out $m(n-m++1)$ times. Therefore, in order to search a sentence of a length $m=10^3$ in a text of a total length $n=10^9$ stored in a magnetic disc or in an optical disk, the number of comparisons amounts to $10^{12}$. As can be easily understood, it is almost unrealistic to retrieve desired information from a large amount of original information such as texts, images, pictures or voice, etc. Accordingly, information retrieval from a large amount of original information in the prior art has been limited to only specific cases: for example, retrieval with the aid of key words which are chosen beforehand, or retrieval of structured data in a table form. Another inconvenience of the string comparator in the prior art is its long processing time needed for "flexible" retrieval, that is, retrieval of strings similar to the reference string as well as the retrieval of the reference itself.

In the following, a string comparator in the prior art and its problems are explained in detail.

FIG. 10 shows an example of a text used for string comparison. For simplification of the drawing, however, only the beginning of the text is actually shown. Such a text is stored in a file memory of a word-processor. A string comparator is expected to directly retrieve desired strings in the texts by means of key words.

For example, in order to known whether the text in FIG. 10 includes strings such as "memory" or "bubble", not only strings perfectly identical with the reference strings, but also strings at least partly identical to the reference strings must be retrieved: for example, retrieval strings include "memory", "memories", "bubble", or "bubbles". Such comparison between the reference string and the original text takes much time if carried out with a conventional program operated computer.

Average English texts on A4-size paper contain about 3000 characters per page including spaces between words. On the other hand, the reference strings, "memory" and "bubble", are both composed of 6 characters. For the comparison between a string of 6 characters and a string of 3000 characters, the number of comparisons comes on the order of the product of the two figures. Even if a character comparison may take only 1 $\mu$sec in a microprocessor, the total retrieval time for each reference string becomes 18 msec per page.

Actually, there may be $10^9$ characters contained in text to be retrieved and 100 characters in a reference string. In addition, there may be several tens of reference strings. In such a case, the time needed for comparison amounts to several hundred hours. However, it is almost impossible to carry out such comparison. In reality, therefore, a key word is manually extracted beforehand from given reference strings and then the comparisons are carried out for the key word by a computer.

SUMMARY OF THE INVENTION

Accordingly, it is an object of the present invention to provide a string comparator dissolving the inconveniences of the prior art mentioned above.

It is another object of the present invention to provide a string comparator and a comparison method capable of extracting "flexibly" in a short time any desired string among non-structural string such as texts, images or pictures.

It is still another object of the present invention to provide such a string comparator in which the length of a reference string can be arbitrary.

It is a further object of the present invention to provide an inexpensive string comparator.

Therefore, in accordance with the present invention, there is provided a string comparator for searching the address of a stored string having substantially the same content as that of an input reference string, comprising: memory means including a number of memory cells in a matrix form having a plurality of rows and a plurality of columns, the row position of each of the memory cells corresponding to the content of the string, the column position of each of the memory cells corresponding to the stored address of the string; and row selecting means coupled to the memory means for selecting a row of the memory cell matrix of the memory means corresponding to the content of the input reference string to be compared, so that the content of the memory cells belonging to the row selected by the row selecting means is read out.

Further, in accordance with another aspect of the present invention there is provided a string comparator for searching the address of a stored string having substantially the same content as that of an input reference string, each string being composed of a plurality of characters, each having a length of $J \times K$ bits. This string comparator comprises:

memory means including a store part composed of memory cells arranged in a matrix form of $2^J \times K \times M$ rows by N columns and a separate indicator arranged in one row by N columns for indicating the occupation of each column of the memory cell matrix;

means coupled to the memory means for selecting one row of the memory cell matrix of the memory means corresponding to the input data to be compared;

means counting input data in response to a clock signal and outputting the content to the row selecting means;

reading means for reading the content of the memory cells belonging to the row selected by the row selecting means and outputting the content of the memory cells of the column of the selected row; and an encoder receiving the output of the reading means and encoding the content of the memory cells of the column in the selected row respectively to the addresses for the input data to be searched.

In accordance with a third aspect of the present invention, there is provided a string comparator for searching the address of an input reference data to be compared with data already stored therein as N kinds of strings, each string composed of M pieces of $J \times K$ bit length character. This string comparator comprises:

a plurality of memory means, each memory means including a store part composed of memory cells arranged in a matrix form of $2^J \times K \times M$ rows by N columns and a separate indicator arranged in one row by N columns for indicating the occupation of each column of the memory cell matrix;

a plurality of row selecting means, each row selecting means coupled to each memory means, for selecting a row of the memory cell matrix of the memory means corresponding to the input data to be compared;

counting means counting input data in response to a clock signal and outputting the content to the row selecting means;

column selecting means for, in response to an input data to be stored at an input address, selecting a column of the matrix of the memory means corresponding to the input address;

a plurality of data writing means, each write data means for writing the input data to be stored in the same numbered column of each matrix selected by the column selecting means;

reading means for reading the content of the memory cells belonging to the row selected by the row selecting means and outputting the content of the memory cells of the column of the selected row; and an encoder receiving the output of the reading means and encoding the content of the memory cells of the column in the selected row respectively to the addresses for the input data to be searched.

The above and other objects, features and advantages of the present invention will be apparent from the following description of preferred embodiments of the invention with reference to the accompanying drawings.

BRIEF DESCRIPTION OF THE DRAWINGS

FIG. 10 illustrates an example of a string to be retrieved.

DESCRIPTION OF THE PREFERRED EMBODIMENTS

Figure 1:
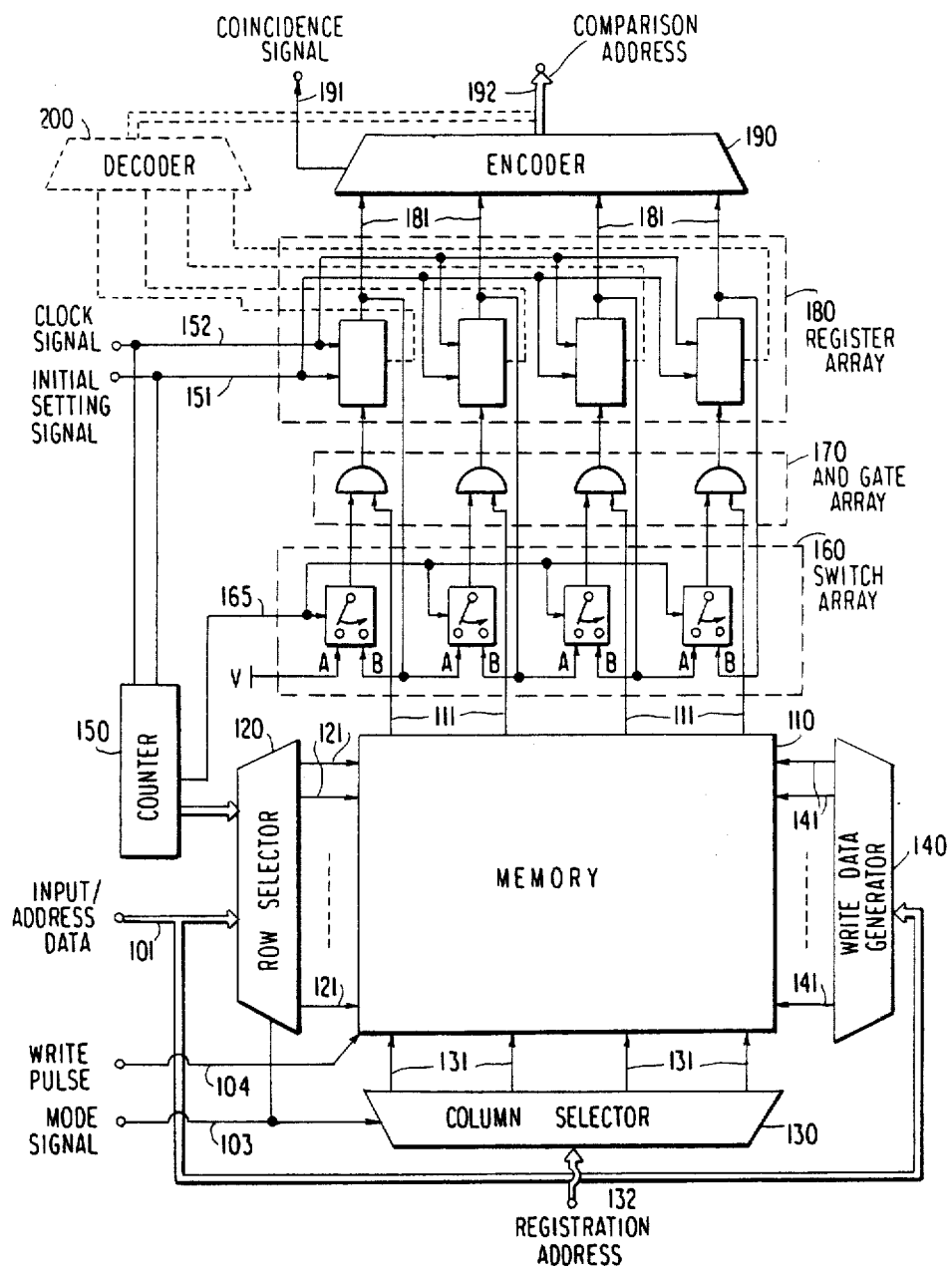
FIG. 1 is a block diagram showing an embodiment of a string comparator according to the present invention.

Referring now more specifically to the drawings, FIG. 1 illustrates an embodiment of the string comparator according to one aspect of the present invention.

The shown string comparator comprises a memory cell matrix and basically has two principal functions: data store and data comparison. In response to an operation mode signal, the string comparator carries out either the store operation or the comparison operation. In the store operation, the string comparator receives input data and a registration address, and writes the input data in one column of the memory cell matrix designated by the registration address. As for data, a text, an image, a picture or voice, each of which forms long strings, can be processed. Such data is encoded and then inputted successively as input data. In the comparison operation, on the other hand, the string comparator receives a reference string and reads out all memory cells in one row of the memory matrix specified by the reference string.

To perform the above-described operations, the string comparator comprises a memory 110 composed of a large number of memory cells arranged in matrix form and receiving a write timing pulse via a write pulse line 104. Word or row lines of this memory 110 are connected in a one-to-one relation to row selection lines 121 of a row selector 120, which is adapted to receive address data supplied via a data bus 101 and a content 155 of a counter 150 as the input data, and an operation mode signal supplied via a line 103 as a control signal. The memory 110 also has bit or column lines connected in a one-to-one relation to column selection lines 131 of a column selector 130, which is adapted to receive the operation mode signal via the line 103 and a registration address via an address bus 132. In addition, the memory 110 is associated with a write data generator 140 which is adapted to receive the input data on the data bus 101 so as to selectively activate write data lines 141 connected to the row lines of the memory 110.

Furthermore, the column lines of the memory 110 are connected respectively through read-out lines 111 to one input of parallel-arranged AND gates in a gate array 170. The other input of each AND gate is connected to the output of a corresponding switch in a switch array 160. Two inputs of each switch are respectively connected to the outputs of each two adjacent registers in a register array 180 to selectively output either of the inputs in accordance with a shift signal 165. Each register is connected at its input to the output of the corresponding AND gate so as to receive the result of the logical operation of the AND gate and to update its content in synchronism with every clock signal 152 in the form of a negative pulse. The output of each register 180 is connected to an encoder 190 having a coincidence signal line 191 and a comparison address outputting bus 192.

Specifically, the memory 110 is constructed with conventional memory cells accessed in accordance with address of the data in question. Input data is stored in each column of the memory 110. In this embodiment, the memory 110 is capable of storing N strings, each string having at maximum M pieces of $J \times K$ bit length character. If each character is supplied in K pieces of J bit length partial data as the input data on the bus 101, the memory 110 can be constructed with memory cells arrayed in a matrix form with $2^J \times K \times M$ rows by N columns. In other words, the memory 110 has a memory capacity of $2^J \times K \times M$ words by N bits. Therefore, for example, the memory 110 can be composed of $K \times M$ blocks, each of which consists of memory cells of $2^J$ rows by N columns, i.e. has the capacity of $2^J$ words by N bits.

In this case, the bit number of the counter 150 which designates one of the blocks is more than $\log_2(K \times M)$. The bit number of the registration address 132 and that of the comparison address 192, both of which designate columns of the memory 110, are respectively $\log_2 N$.

The string comparator can be of various constructions depending on the choice of values for J, K, M and N. As an example, suppose that a string is composed of alphanumeric characters, Japanese Katakana characters, etc. and that each character is represented with 8 bit US ASCII code and is inputted as input data on the bus 101 in two steps: at first, the most significant 4 bits and then the least significant 4 bits. This means that $J=4$ and $K=2$. In addition, if M (the maximum length of a string storable in one column) is put as 8 and the number of memory cells in the memory 110 is put as 1 Mbits, the number of columns N becomes 4096. Therefore, the bit number of the counter 150, the register address 132 and the comparison address 192 become 4 bits, 12 bits and 12 bits, respectively. The number of the memory blocks in 16 and the word number in each block is 16. In summary, the memory with a memory capacity of 256 words by 4096 bits is capable of storing 4096 strings, each string being composed of 8 characters at most.

Figure 2:
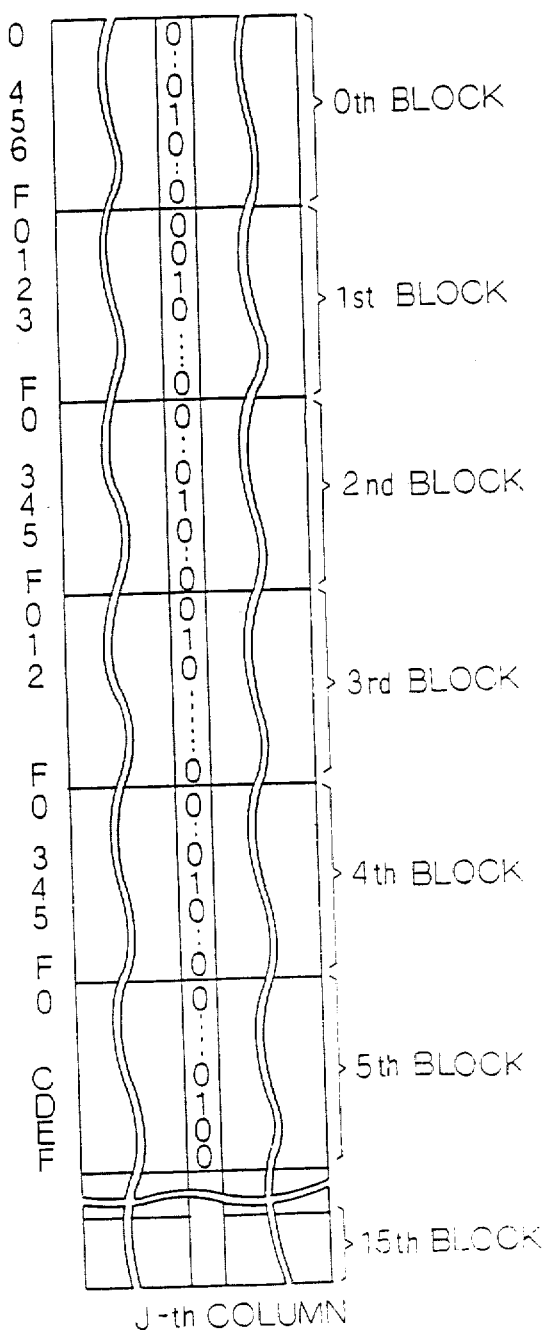
FIG. 2 is an illustration of a store pattern in the memory used in the string comparator shown in FIG. 1.

Now, referring to FIG. 2, the store operation and the comparison operation are explained in detail.

FIG. 2 illustrates the content of the memory 110. In the figure, as an example, a string "RAM" is stored at J-th column or at the registration address J of the memory 110. Each character of the input string, which is represented in 8 bit ASCII code, is divided into two parts: the most significant 4 bits and the least significant 4 bits, which are then stored in two different memory blocks. The string "RAM" is represented in terms of ASCII code as "52, 41, 4D" in hexadecimal notation. This string in ASCII code is cut into partial data pieces each consisting of 4 bits, and each partial data piece is stored in one column of one memory block in such a manner that, in each block, "1" is stored at only one row specified by the partial data. In this example, "1" is stored in the 0th to 5th blocks at the 5th, 2nd, 4th, 1st, 4th and D-th rows, respectively. In other rows, "0" is stored. In summary, each character in terms of ASCII code is stored in two consecutive blocks.

Next, the store operation will be explained, assuming that the string "RAM" is stored at an address J in the memory 110. When the mode signal 103 is rendered to a logical level of "1", the string comparator is put in the store mode. In response to the mode signal 103 of "1", the column selector 130 decodes the address information which designates the address "J" and which is supplied via the address bus 132. Namely, the column selector 130 selectively drives the J-th column selection line 131. In addition, the initial setting signal 151 is given to the counter 150 to clear its count content 155. In response to the operation mode signal 103 of "1", and in accordance with the cleared content of 155 of the counter 50, the row selector 120 designates the 0th block of the memory 110 and drives in parallel all the row selection lines 121 in the 0th memory block.

As already shown, on the other hand, the string "RAM" is represented as "52, 41, 4D" in ASCII code, and each character is divided into two partial data pieces: the most significant 4 bits and the least significant 4 bits. Namely, the input address data 101 are composed of a sequence of partial data pieces "5", "2", "4", "1", "4" and "D". Therefore, the write data generator 140 receives and decodes such input address data supplied via the data bus 101, and then, applies the decoded data to the write data lines 141. Specifically, the generator 140 first activates only one row of each block of the memory 110 specified by the input data on the bus 101 of "5" in hexadecimal notation. Thus, as seen from FIG. 2, in synchronism with the write pulse 104, "1" is stored at the 5th row position designated by the input partial data on the bus 101 consisting of 4 bits and indicating "5" in hexadecimal notation, on the J-th column designated by the registration address 132, in the 0th block designated by the counter 150 through the row selector. When the write operation of the first partial data is finished, the content of the counter 150 is supplied with the clock signal 152 and incremented by "1", and the counter then specifies the 1st block of the memory 110 for storing the next partial data "2".

In order to store the whole of the string "RAM", the above mentioned write operation is repeated five times for the rest of the partial data sequence "2", "4", "1", "4" and "D". When all the operations are finished, the input data are stored at the J-th column of the memory 110 as shown in FIG. 2.

In this example, 8 characters can be stored at maximum in each column of the memory 110. In order to store a string having a length longer than 8 characters, the characters in excess of the first 8 characters are stored at the adjacent column by increasing the registration address 132. In this way, a string with an arbitrary character length can be stored.

Next, explanation is given on the comparison operation by inputting "RAM" as a reference string when the same string is stored at the J-th column of the memory 110. "0" is first applied as an operation mode signal 103 to designate the comparison operation. Then, the row selector 120 drives selectively one row selection line 121 specified by the input data on the bus 101 in the block designated by the signal 155 from the counter 150. On the other hand, the column selector 130 drives all the column selection lines 131 in parallel.

The counter 150 outputs from its internal circuit a carry signal 165 when the content of the counter is zero. In this example, the carry signal 165 is outputted for every 16 input partial data, because the memory 110 is composed of 16 blocks and the bit number of the counter 150 is 4 bits. The carry signal 165 is applied to the control input of each switch of the switch array 160. Each switch selects A-input when the carry signal 165 is applied. The A-input of the 0th or leftmost switch is always applied with "1". As for the other switches, the A-input is connected to the output of the register 180 of the column just at the left, and the B-input of each switch is connected to the output of the register 180 in the same column.

At the same time as the application of the operation mode signal 103, the counter 150 is cleared and all the registers 180 are initialized by the initial setting signal 151. On the other hand, a sequence of partial data pieces of the reference string are inputted in synchronism with a negative clock pulse signal 152. In this example, the partial data pieces of the string "RAM", i.e., "5", "2", "4", "1", "4" and "D" are sequentially applied via the input data bus 101. The content 155 of the counter 150 is incremented by "1" for each clock signal 152. Thus, the row selector 120 successively drives the 5th row of the 0th block, the 2nd row of the 1st block, the 4th row of the 2nd block, the 1st row of the 3rd block, the 4th row of the 4th block and the D-th row of the 5th block. The data signals stored in the respective rows thus driven are sequentially read out via the read-out line 111 in synchronism with the clock signal 152 for each block. The read-out signals are then applied to the AND gate array 170.

When the first input data piece of "5" in hexadecimal notation in this example is inputted, the carry signal 165 is applied to the switch array 160 so that all the switches in the switch array 160 operate to output the A-input of all the switches. At this time, since all the registers of the array 180 are initialized by the initial setting signal 151 to output a signal of the logical level "1", all the switches supply a signal of "1" to the AND gates. Therefore, the read-out signal 111 based on the first input data piece 101 is inputted in the register 180 via the corresponding AND gate 170 and registered in synchronism with the clock signal 152. As can be understood from FIG. 2, "1" is outputted as the read-out signal 111 from the J-th column of the memory 110.

Thereafter, each switch in the array 160 outputs its B-input to the corresponding AND gate in the array 170, since the carry signal 165 is not supplied to the switch array 160 until after the 16th partial data is inputted. Accordingly, the result of the logical product of each read-out signal 111 and the output of the corresponding register in the array 180 is outputted from the corresponding AND gate, and held in the corresponding register of the array 180 in synchronism with each clock signal 152. Thus, when the string "RAM" is inputted, all the read-out signals 111 outputted from the J-th column at each clock signal will be "1", and therefore, when the input of the reference string "RAM" has been completed, the content of the register 180 corresponding to the J-th column becomes "1", and "0" is outputted from the other registers 180.

The contents of all the registers 180 are applied as the comparison result signals 181 to the encoder 190. When the comparison result signals 181 include "1", the encoder 190 outputs to an external apparatus a coincidence signal 191 and converts the position of the column supplying the comparison result signal of "1" into an address of binary code. The coincidence signal 191 indicates whether or not the information identical with the reference information is stored in the memory 110, and the comparison address 192 indicates the position of the column where the comparison result signal 181 having "1" is outputted, i.e., the address of the location storing the information identical with the reference information. In this example, the comparison address 192 indicating the J-th column of the memory is outputted.

When one string is divided and stored in a plurality of columns and a reference string has a length exceeding the number of the blocks of the memory 110, the comparison operation will then be carried out similarly to the operation mentioned above. In this case, when the number of partial data pieces which have sequentially been supplied to the row selector 120 has just exceeded the number of the memory blocks in the course of the comparison operation, the counter 150 is reset to the value "0". Then, the counter 150 outputs a carry signal 165 to each switch 160 so as to connect its output to its A-input which is coupled to the register at the immediate left of the column of that switch. Therefore, the result of the logical product of adjacent read-out outputs 111 from the memory 110 is held in each register 180. As a consequence, it is possible to carry out the comparison operation for a string of an arbitrary length stored in a plurality of columns.

In case of multiple coincidence where a plurality of data stored in the memory 110 are equal to the reference string, the comparison result signal 181 of "1" is generated from a plurality of the registers. In this situation, the encoder 190 encodes the position of the registers holding "1" in the order of the highest place register to the lowest place register from left to right. Therefore, the encoder 190 first outputs the comparison address 192 of the highest place register holding "1". In order to output the remaining comparison addresses 192, as shown in broken line in FIG. 1, a decoder 200 is provided to decode the comparison address 192 from the encoder 190 and to output a reset signal to the register 180 specified by the comparison address 192 just read out. Then, the encoder 190 outputs the next comparison address 192. By a sequential generation of the reset signal at each outputting of the comparison address 192, all the remaining comparison addresses 192 are successively outputted to the external apparatus.

Comparison operation by masking a portion of each string can be carried out by inhibiting the application of the clock signal 152 to the registers 180 at the time of outputting the read-out signal 111 concerning the partial data to be masked.

A string comparator explained above can be constructed using a conventional memory 110 of $2^J \times K \times M$ words by N bits. The string comparator is capable of executing the comparison operation for a string having an arbitrary length.

Figure 3:
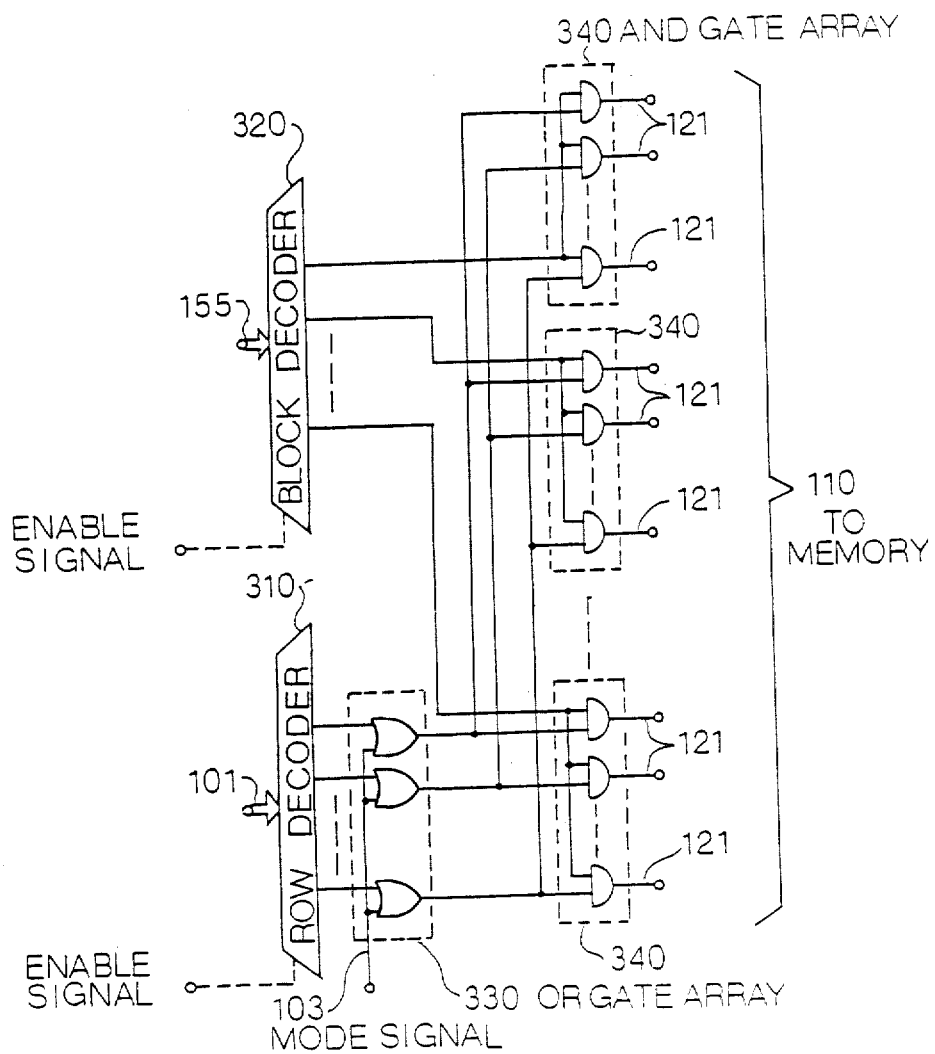
FIG. 3 is a block diagram of an embodiment of the row selector shown in FIG. 1.

FIG. 3 shows an embodiment of the row selector 120 of the string comparator shown in FIG. 1. The shown row selector 120 comprises a row decoder 310 receiving the input data on the bus 101 and a block decoder 320 receiving the content 155 of the counter 150. The block decoder 320 includes a plurality of parallel output lines and operates to drive one of the output lines designated by the content 155 of the counter 150. The row decoder 310 includes a plurality of parallel output lines and operates to drive one of the associated output lines designated by the input data, which is a partial data piece of a reference string or an input string. The output lines of the row decoder 310 are respectively connected in one-to-one relation to one input of two-input OR gates which are arranged in parallel to form an OR gate array 330. The other input of each OR gate is supplied with the operation mode signal 103. Outputs of all the OR gates are connected to all AND gate arrays 340, each of which is associated with one of the memory blocks. On the other hand, each output of the block decoder 320 is connected to the corresponding one AND gate array 340.

Specifically, each of the AND gate arrays 340 comprises a plurality of two-input AND gates arranged in parallel. In each AND gate array, one input of each AND gate is connected to the output of the corresponding one OR gate in the one OR gate array 330; the other inputs of all the AND gates are connected in common to the corresponding one output line of the block decoder 320. The outputs of all the AND gates are each supplied to the corresponding row of the memory 110 via each row selection line 121.

In the store operation, "1" is applied as the operation mode signal 103. Then, "1" is outputted from all OR gates of the OR gate array 330 to all the AND gates of all gate arrays 340. On the other hand, the block decoder 320 activates only one output line specified by the count output 155 of the counter 150. As a consequence, all the row selection lines 121 in one AND gate array 340 specified by the counter output 155 are driven in parallel. Therefore, all rows of the specified memory block are put in a data writable condition.

In the comparison operation, "0" is applied as the operation mode signal 103. Therefore, "1" is outputted from only one OR gate in the OR gate array 330 specified by the input data on the bus 101, so that the same numbered AND gates of the respective gate arrays 340 receive a signal of "1" at their one input. On the other hand, the block decoder 320 activates only one output line specified by the count output 155 of the counter 150. Thus, there is selectively driven one of the row selection lines 121 designated by the row decoder 310, in one AND gate array 340 specified by the count output 155 of the counter via the block decoder 320.

Figure 4:
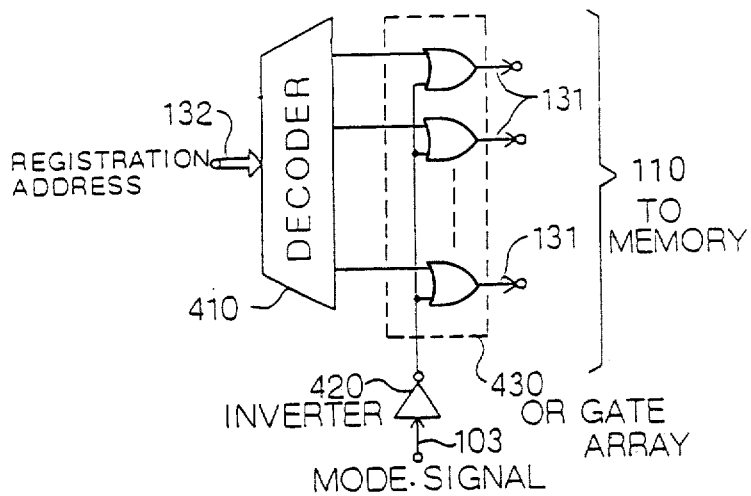
FIG. 4 is a block diagram of an embodiment of the column selector shown in FIG. 1.

FIG. 4 shows an embodiment of the column selector 130 of the string comparator shown in FIG. 1. The column selector 130 comprises a decoder 410 which receives the registration address 132. The decoder also has parallel output lines which are respectively connected to one input of the corresponding two-input OR gates in a gate array 430. The decoder 410 operates to decode the input address so as to selectively output a binary signal of "1" from one of its output lines designated by the input data. The column selector 130 also includes an inverter 430 having an input connected to the line 103 to receive the mode signal and an output connected in common to the other inputs of all the OR gates in the OR gate array 430 so as to supply the inverted mode signal to these OR gates. The outputs of the respective OR gates in the OR gate array 430 are connected to the corresponding column selection lines 131.

In the store operation, "1" is applied as the operation mode signal 103 to the inverter 420, and so, the binary signal of "0" is supplied to the other inputs of all the OR gates in the OR gate array 430. Therefore, the decoder 410 selectively drives one of the column selection lines 131 specified by the registration address 132 and permits the input data to be written in the selectively driven column.

In the comparison operation, since "0" is applied as the operation mode signal to the inverter 420, the inverter 420 outputs the binary signal of "1" to all the OR gates in the OR gate array 430 to drive in parallel all the column selection lines 131 without being influenced by the outputs from the decoder 410. Therefore, data of all the columns of the memory 110 can be read out in parallel.

Figure 5:
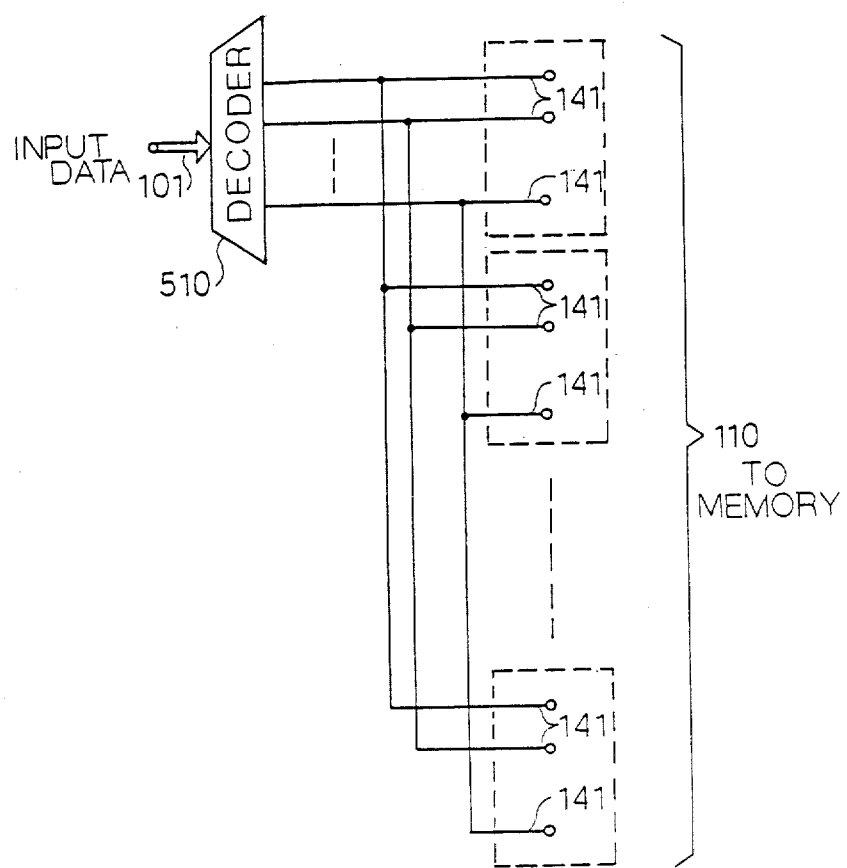
FIG. 5 is a block diagram of an embodiment of the write data generator shown in FIG. 1.

FIG. 5 is an embodiment of the write data generator 140 of the string comparator shown in FIG. 1. The write data generator comprises a decoder 510 having an input connected to the data bus 101 to receive the input data as the store information. The decoder 510 has parallel outputs of the same number as that of the rows in each memory block, and operates to output a binary signal of "1" from one of its outputs designated by the input data 101. As shown in FIG. 5, each output of the decoder 510 is branched and connected to the same numbered write data lines 141 of each memory block.

As the decoder 510, the row decoder 310 used in the string comparator in FIG. 3 can be used. For this purpose, the output lines of the row decoder 310 are connected to the write data lines 141 as shown in FIG. 5, respectively. Thus, the row selector 120 can be used also as the write data generator 140.

Figure 6:
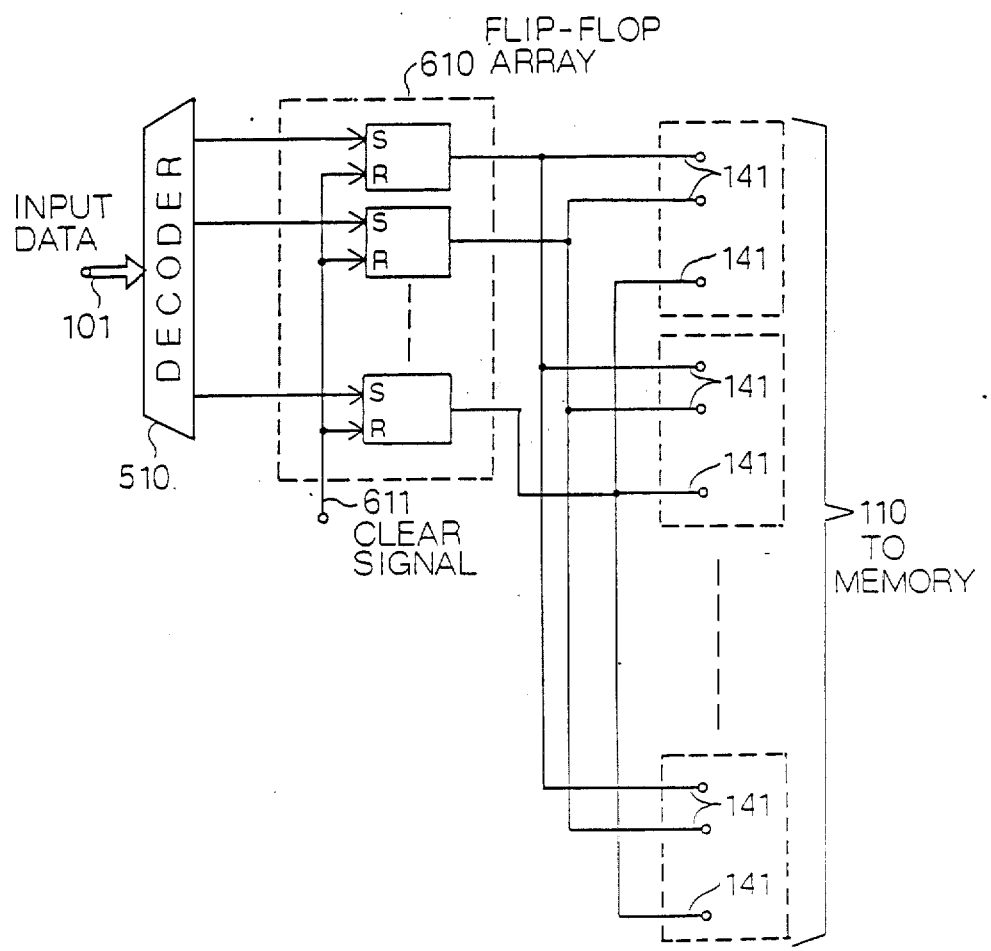
FIG. 6 is a block diagram of another embodiment of the write data generator shown in FIG. 1.

FIG. 6 is another embodiment of the write data generator 140 of the string comparator shown in FIG. 1. A flip-flop array 610 is further equipped in addition to the decoder 510 shown in FIG. 5. The flip-flops in the flip-flop array 610 are cleared by a clear signal 611, which is not shown in FIG. 1. Input data 101 designates a flip-flop via the decoder 510.

The difference between capital and small letters of the ASCII code for English alphabet is designated by the 6th bit from the least significant bit. In storing the input data 101, it is desirable that capital letters and small letters are treated as the same. In English, further, nouns often change their ending in the plural, and verbs are inflected depending on the tense. If such words having the same stem are classified in the same group, one of those words can represent the group, and as a consequence, a remarkable reduction of columns needed for storing similar words can be realized. In this case, a plurality of partial data must be stored in the same block. The flip-flop 610 is equipped to accomplish this purpose. If a plurality of partial data are applied to the decoder 510 after the clear signal 611 is supplied to all the flip-flops in the flip-flop array 610, the logical sum concerning a plurality of partial data pieces is stored in the flip-flop array 610, and then outputted to the corresponding write data lines 141.

Figure 7:
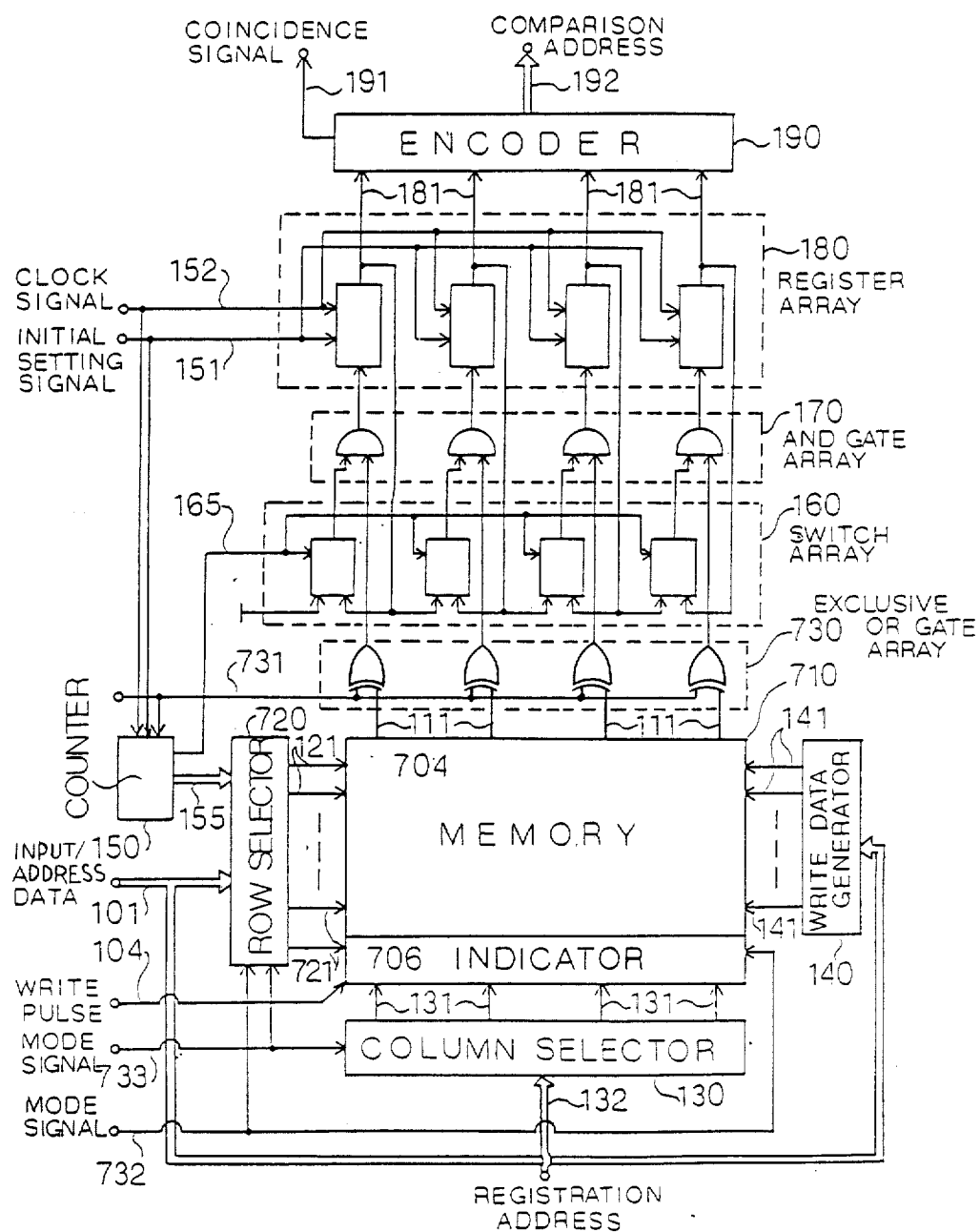
FIG. 7 is a block diagram showing another embodiment of a string comparator according to the present invention.

Turning to FIG. 7, there is shown another embodiment of the string comparator according to the present invention. This string comparator is capable of deleting strings stored in the memory and reading out addresses of the empty memory portions. For this purpose, the string comparator is equipped with an EXCLUSIVE-OR gate array 730 in addition to the string comparator shown in FIG. 1. Furthermore, some modifications have been made on the memory 110 and the row selector 120. Instead of the memory 110, an extended memory 710 is equipped, which is composed of a memory part 704 corresponding to the memory 110 in FIG. 1 and an indicator 706 which is constructed with one row memory cell for the purpose of indicating which columns are used. Instead of the row selector 120 in FIG. 1, an extended row selector 720 is equipped, which controls not only the row selection lines 121 connected to the memory part 704 but also a row selection line connected to the indicator 706.

The EXCLUSIVE-OR gate array 730 includes two-input EXCLUSIVE-OR gates of the same number as that of the columns of the memory 710. These EXCLUSIVE-OR gates 730 have one input connected in common to receive an inverted signal (I) 731 and their other input connected to the corresponding columns of the memory 710, respectively. An output of each EXCLUSIVE-OR gate 730 is connected to the one input of the corresponding AND gate in the AND gate array 170. The inverted signal 731 is also supplied to the counter 150, so that the counter 150 is cleared by either the initial setting signal 151 or the inverted signal 731. Furthermore, a first operation mode signal (M1) 732 and a second operation mode signal (M2) 733 are supplied to the row selector 720. The second mode signal 733 is similar to the mode signal 103 in the embodiment shown in FIG. 1, and therefore, is fed to the column selector 130. The first mode signal 732 is also applied to the write data line of the indicator 706.

As for the elements such as the column selector 130, the write data generator 140, the switch array 160, the AND gate array 170, the register array 180 and the encoder 190, the same ones as used in the string comparator in FIG. 1 can be used. Therefore, explanation will be omitted on the same portions as those of the comparator shown in FIG. 1.

The string comparator can selectively take one of the following five operation modes according to the logical values of the first operation mode signal (M1) 732, the second operation mode signal (M2) 733 and the inverted operation signal (I) 731. Using a denotation for these signals as (M1, M2, I), the five operations can be expressed as:

(0, 0, 0) for comparison operation;
(0, 1, X) for deletion operation;
(1, 0, 0) for initial setting operation of the register array 180;
(1, 0, 1) for read-out operation of the content of the indicator of the extended memory 710; and
(1, 1, 0) for store operation of strings.

Where the notation "X" can be either "1" or "0".

In the store operation, all the row selection lines 121 of a memory block specified by the content 155 of the counter 150 are driven in parallel together with the row selection line 721 of the indicator 706 by the row selector 720 receiving the first and second mode signals 732 and 733 of "1". Since the first operation mode signal 732 is supplied to the write data line of the indicator 706, a binary signal of "1" indicating that the column has been occupied with store information, is stored in the column of the indicator 706 designated by the registration address 132. In the memory part 704, thereafter, the string is stored just as in the memory 110 of the string comparator shown in FIG. 1.

In the deletion operational, the row selector 720 also drives the row selection line 721 of the indicator 706. However, since the first operation mode signal 732 of "0" is applied to the write data line of the indicator 706, a binary signal of "0" is stored in the column of the indicator 706 designated by the registration address 132.

In other words, the content in each column of the indicator 706 represents, by binary data of "1" or "0", whether or not the corresponding column of the memory part 704 stores a string to be retrieved.

In the read-out operation of the content of the indicator 706, the initial setting signal 151 is first applied to the registers in the register array 180 to set the content thereof to "1". Next, three mode signals of the values (1, 0, 1) areapplied respectively as the first operation mode signal 732, the second operation mode signal 733 and the inverted operation signal 731. Then, the row selector 720 drives only the row selection line 721 of the indicator 706, while the column selector 130 drives all the column selection lines 131 in parallel. Therefore, the content of the indicator 706 is outputted from the read-out lines 111 connected to the memory 710. The read-out signals 111 from each column is then applied to one input of each EXCLUSIVE-OR gate in the EXCLUSIVE-OR gate array 730. The other input of the EXCLUSIVE-OR gate receives "1" of the inverted mode signal 731. As a consequence, the EXCLUSIVE-OR gate outputs the inverted signal of the read-out signal 111 from the indicator 706. This output is applied to one input of the corresponding AND gate in the AND gate array 170. The other input of the AND gate is connected to the switch 160. At this time, since the counter 150 is cleared by the inverted mode signal 731 of "1", the carry signal 165 is outputted. Consequently, each switch selects the A-input and outputs a binary signal of "1" to the AND gate.

Thus, each read-out signal 111 is inputted and stored in the corresponding register 180 via the AND gate 170 in synchronism with the clock signal 152. The information stored in the register 180 is the inverse of that stored in the indicator 706. In other words, "1" is stored in the register 180 which corresponds to the empty column of the memory means 710. The address of the empty column is outputted via the encoder 190 as the comparison address 192, indicating the address of the columns in which additional data can be stored. At the same time, the coincidence signal 191 is outputted from the encoder 190, when there remain empty columns, "1" is outputted; otherwise "0" is outputted.

The string comparator is also capable of storing long input strings each of which necessitates a plurality of columns for its store as in the string comparator shown in FIG. 1. When long and successive pluralities of empty columns are necessary for the store of a long additional string, empty addresses can be obtained by supplying the same number of clock signals 152 as the necessary empty columns.

Even if the clock signal 152 is supplied to the counter 150, the counter 150 continues to output the carry signal 165 because it receives "1" as the inverted signal 731. In accordance with the carry signal 165, each switch in the switch array 160 selects A-input and adjacent registers 180 are connected in series through the AND gates 170. Therefore, when the clock signals 152 are applied n times, "1" is stored only in the registers 180 corresponding to the columns on the left of which more than n empty columns exist in series in the memory matrix. The address of the columns are outputted via the encoder 190 as the comparison address 192. The head address of the reference string stored in n consecutive columns can be obtained by subtracting n from the comparison address 192. In this way, the registration address can be easily obtained at which a long string can be stored in a plurality of continuous columns. Thus, on the basis of the registration address thus obtained, a registration operation will be carried out similarly to the first embodiment shown in FIG. 1.

In the comparison operation, the inverted signal 731 of "1" and the initial setting signal 151 are supplied, so that the counter 150 is cleared, and at the same time, each register 180 is set. Thereafter, three mode signals of the values (0, 0, 0) and the clock signal 152 are applied. Then, the row selector 720 drives the row selection line 721 of the indicator 706, while the column selector 130 drives all the column selection lines 131 in parallel. Therefore, the content of the indicator 706 is outputted from the read-out lines 111 connected to the memory 710. The read-out signal 111 from each column is then applied to one input of each EXCLUSIVE-OR gate in the EXCLUSIVE-OR gate array 730. The other input of the EXCLUSIVE-OR gate then receives "0" of the inverted mode signal 731. As a consequence, the EXCLUSIVE-OR gate outputs the same signal as the read-out signal 111 from the indicator 706. This output is applied to one input of the corresponding AND gate in the AND gate array 170. The other input of the AND gate is connected to the switch 160. At this time, since the counter 150 is cleared by the inverted mode signal 731 of "1", the carry signal 165 is outputted. Consequently, each switch in the switch array 160 selects the A-input and outputs a binary signal of "1" to the AND gate. Therefore, each read-out signal 111 is inputted and stored in the register 180 via the AND gate 170 in synchronism with the clock signal 152. In summary, "1" is stored as the initial value only in the registers 180 corresponding to the columns columns in which any data string is stored.

After the above mentioned operation is finished, the counter 150 is again cleared by the inverted signal 731 in the form of a positive pulse. Next, reference data 101 is applied in synchronism with the clock signal 152 as partial data of the reference string, so that the comparison operation will be performed just as with the string comparator shown in FIG. 1.

As explained above, this string comparator can be constructed with conventional memory cells and is capable of processing a string having an arbitrary length. In addition, coincidence for the empty columns can be eliminated, because "1" is stored as the initial value only in the registers 180 corresponding to the columns in which the data string is stored. Another advantage is that the string comparator needs no external component for the control of empty columns, because the address of successive empty columns having an arbitrary length can be outputted as a comparison address 192, which results in a yet more simplified string comparator.

Figure 8:
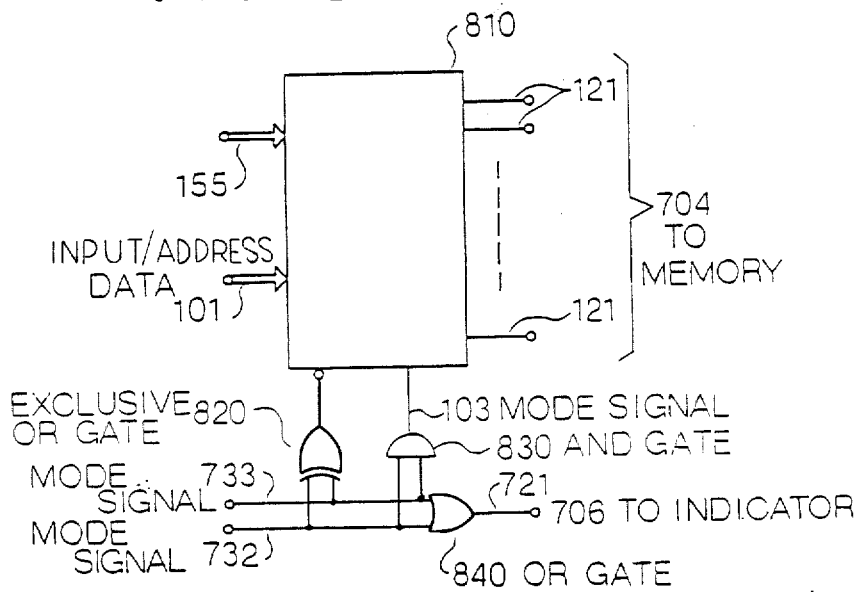
FIG. 8 is a block diagram of an embodiment of the row selector shown in FIG. 7.

FIG. 8 shows an embodiment of the row selector 720 of the string comparator shown in FIG. 7. The row selector 720 comprises row selecting part 810 receiving the input data on the bus 101 and the content 155 of the counter 150, an EXCLUSIVE-OR gate 820, and AND gate 830 and an OR gate 840, as shown. The row selecting part 810 corresponds to the row selector 120 of the string comparator shown in FIG. 3. The three gates 820, 830 and 840 receive two operation mode signals 732 and 733, respectively. The output of the EXCLUSIVE-OR gate 820 is inverted and then supplied to enable signal inputs of the row decoder 310 and the block decoder 320 in the row selector 120. When the inputted enable signal is "0", each output from the row decoder 310 and the block decoder becomes "0". The output of the AND gate 830 is supplied to the mode signal input 103 of the OR gate array 330 shown in FIG. 3. In addition, the output of the OR gate 840 is connected to the row selection line 721 of the indicator 706.

In the store operation where "1" is applied both to the first operation mode signal line 732 and the second operation mode signal line 733, since the enable signal inputs of the two decoders 310 and 320 are supplied with the logical level "1", the row selector 720 drives in parallel all the row selection lines 121 and 721, similarly to the store operation of the first embodiment shown in FIG. 1. On the other hand, in the comparison operation where "0" is applied both to the first and the second operation mode signal lines 732 and 733, since "1" is also applied to the enable signal input of the decoders 310 and 320, the row selector 720 drives selectively the row selection line 121 designated by both the content 155 of the counter 150 and the input data, similarly to the comparison operation of the FIG. 1 embodiment. In other situations when the combination of the first and the second operation mode signals 732 and 733 is (1, 0) or (0, 1), only the row selection line 721 connected to the indicator 706 is driven. As explained above, various operations of the string comparator can be carried out by controlling the two operation mode signals which are responsible for the driving of row selection lines 121 and 721.

Figure 9:
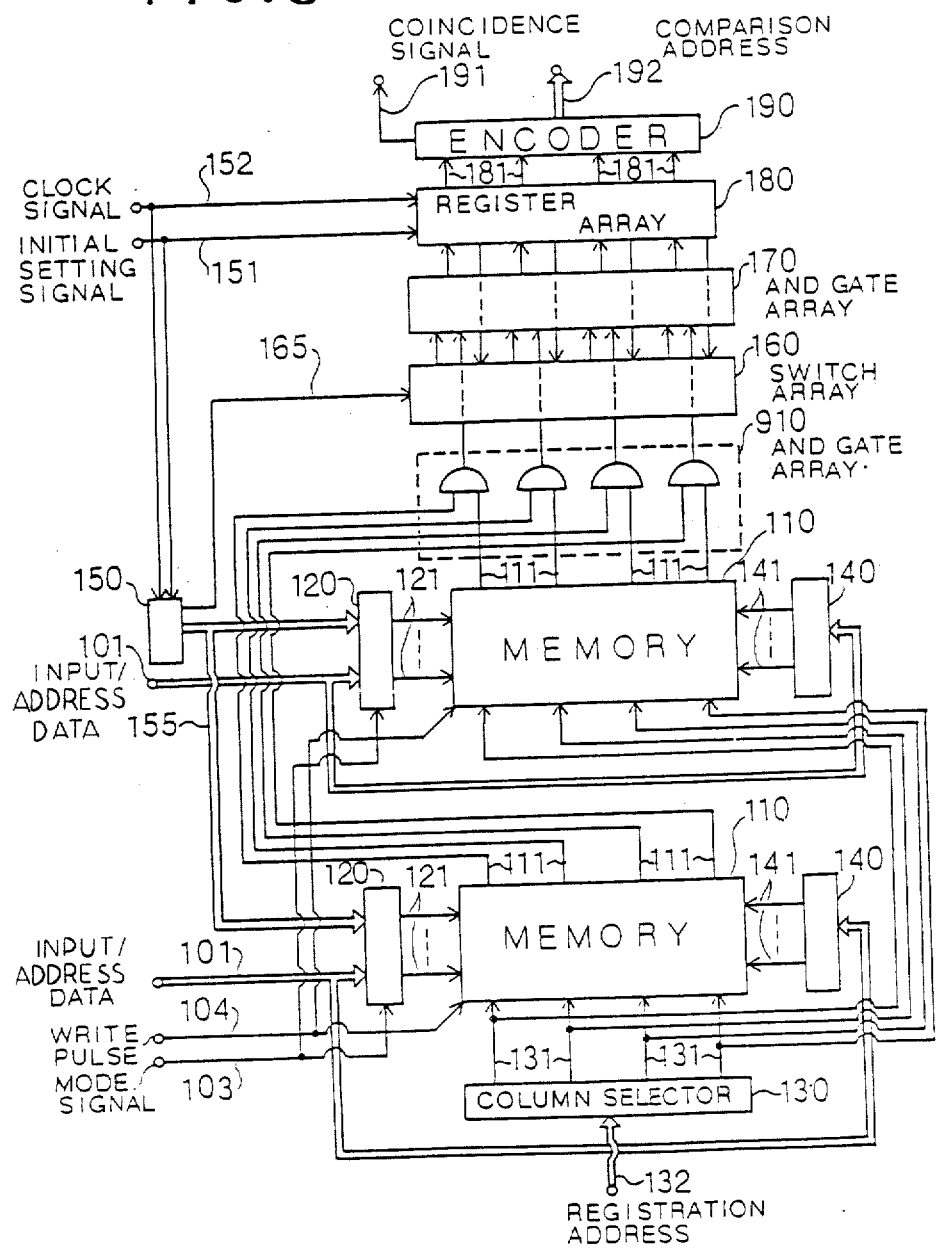
FIG. 9 is a block diagram showing a third embodiment of a string comparator according to the present invention.

FIG. 9 shows a third embodiment of the string comparator according to the present invention. The string comparator differs from that shown in FIG. 1 in several points: it comprises two memories 110, two row selectors 120 and two write data generators 140 instead of the single memory 110, the single row selector 120, and the single write data generator 140; and there is provided a new AND gate array 910 for the logical product operation of the read-out signals 111 from the two memories 110. Accordingly, an 8 bit ASCII code which is separated into two parts of the most significant 4 bit data and the least significant 4 bit data, is inputted in parallel to the two memories 110. This presents a remarkable contrast to the string comparator in FIG. 1 where the 8 bit ASCII code is inputted to the string comparator as a series of two 4 bit partial data pieces of the most significant 4 bit data and the least significant 4 bit data. Therefore, the time needed for the comparison and store operations is shortened so as to be one half of that needed for such operations in the string comparator in FIG. 1.

As for the memories 110, the row selectors 120, the column selector 130, the write data generators 140, the counter 150, the switch array 160, the AND gate array 170, the register array 180 and the encoder 190, the same ones can be used in FIG. 1.

Broken lines in the switch array 160 and the AND gate array 170 indicate that signals pass through each array, that is, the outputs of the AND gate array 910 are inputted to the AND gate array 170 without being inputted to the switch array 160 and the outputs of the register array 180 are inputted to the switch array 160 without being inputted to the AND gate array 170.

Each character of the stored strings and the reference strings is given as an 8 bit ASCII code and is applied in parallel to the memories 110 by dividing it into two 4 bit partial data pieces: the most significant 4 bit data and the least significant 4 bit data. The read-out signals 111 of each 4 bit partial data from each memory 110 are inputted to the AND gate array 910 and then outputted to the AND gate array 170. The outputs of the AND gate array 910 correspond to the read-out signals 111 in FIG. 1. The outputs of the AND gate array 910 indicate whether or not each character of the string stored in the two memories are identical with the reference string inputted by dividing into two partial data. Logical product operations are successively carried out in each AND gate 910 for the output for each character of the stored string. The output of the AND gate is stored in the corresponding register in the register array 180. The comparison result signal 181, i.e. the output signal from the register 180, is outputted as the comparison address 192 via the encoder 190. In this way, the comparison operation is carried out as in the string comparator in FIG. 1.

In the store operation, ASCII codes for each character are stored with the pattern as shown in FIG. 2 in the two memories 110 just as in the string comparator in FIG. 1, after being divided into two 4 bit partial data; the most significant 4 bit data and the least significant 4 bit partial data.

As explained above, the time needed for the store and comparison operations are remarkably shortened compared with that needed for such operations in the string comparator in FIG. 1. Reduction of components of the string comparator is possible by using the row decoder 310 in the row selector 120 also as the write data generator 140, and by eliminating either of the two block decoders 320 and in the row selectors. If the corresponding read-out signals 111 of the two memories 110 are connected to each other by wired-ANDs, the AND gates in the AND gate array 910 can be eliminated. Therefore, with only a little increase of hardware, the operation speed is increased greatly.

In addition, the string comparator can be equipped with an indicator indicating the occupation of the columns of the memory 110, as shown in FIG. 7. With the indicator, empty columns of the memory 110 can be easily obtained.

As explained so far in detail, the string comparator according to the present invention can be constructed with conventional inexpensive memory cells, which results in the reduction of cost. A string comparator capable of storing N input strings, each string being composed of M pieces of $J \times K$ bit length character, can be constructed with a memory with $2^J \times K \times M$ words by N bits or with K memories, each memory having a capacity with $2^J \times M$ words by N bits. Therefore, using a 1 Mbit memory chip, 8192 strings can be stored in one chip, each string having the length $M=8$ and each character of the string represented by 8 bit ASCII code with $J=2$ and $K=4$.

As mentioned above, if the k1 Mbit memory is used the string comparator according to the present invention is capable of storing 8192 strings in one chip, each string being composed of 256 characters. This means that as many as 8192 key words can be extracted at one time from strings which constitute an original document file, for example, made up using a word-processor. In consideration of the difficulty of retrieval of many key words at one time in the prior art, the string comparator according to the present invention is an innovative device.

The string comparator is also applicable to the classification of a specific sequence in system for pattern recognition such as an OCR device and a voice recognition apparatus. The string comparator composed of only one LSI chip can be used as a dictionary for the translation among human languages. With ten such chips, a dictionary containing about 80,000 words required for practical use can be obtained. For this purpose, a conventional RAM is connected to each chip and a translation for each word is stored in correspondence to the classification code of each string. With this arrangement, 8192 translations for the corresponding words per one chip, or 80,000 translations in total in ten chips can be obtained immediately after the input operation of strings. The conventional RAM is capable of storing a variety of information in accordance with the classification code of strings, and therefore, various information processing functions are carried out. For example, if processing commands are stored for the classification code of strings with respect to part-of-speech codes of words, the number of appearance of specific strings and sentences composed of strings, collection and arrangement of knowledge information can be easily made.

In addition, the string comparator is capable of storing a long string in a plurality of columns of the memory. The string comparator is also capable of store and comparison operations for an input string with an arbitrary length. The string comparator is further capable of outputting empty columns with an arbitrary length in the memory as the comparison address 192, which facilitates the control of empty columns from an external and results in the reduction of cost.

As for the processing speed of the string comparator, a cycle time $T_c$ of a RAM used in the memory 110 or 710 corresponds to the processing time for one character in a string. Supposing that $T_c$ is 100 ns, the time needed for the comparison operation of an original text with $10^9$ character length by a string with $10^3$ characters is 10 seconds. In contrast, the time needed for the comparison amounts to about 10 hours, if the comparison operation is carried out by a computer using a sophisticated program available at present. Therefore, remarkable reduction of comparison time can be realized with the aid of the string comparator according to the present invention.

As summarized above, the string comparator according to the present invention is capable of solving the two important problems of the processing in the prior art which is performed by the combination of a microcomputer and a sophisticated program; long processing time and lack of flexibility in comparison operation by classification of strings. Considering that the string comparator in accordance with the present invention can be constructed with one LSI chip, such an LSI is a functional device inevitable for extraction of key words from an original text file, a dictionary for translation among human languages and the classification of specific sequence in the pattern recognition systems.

The invention has thus been shown and described with reference to specific embodiments. However, it should be noted that the invention is in no way limited to the details of the illustrated structures but changes and modifications may be made within the scope of the appended claims.

We claim:

1. A string comparator for searching the address of a stored string having substantially the same content as that of an input reference string, comprising:

memory means, including a number of memory cells arranged in a matrix form having a plurality of rows and a plurality of columns, the rows of the memory means being grouped into a plurality of groups, and one string being written to a portion of one column corresponding to one group of rows such that one of the memory cells belonging to one group of rows in the same column has a predetermined binary value written thereto, so that the column position indicates an address of a string stored in each column and a position of one memory cell having the predetermined binary value of the memory cells written thereto belonging to the same column and to the same row group indicates a content of a string stored in the above mentioned portion of one column corresponding to one row group;

means, coupled to the memory means, and including a plurality of row decoders, each provided in correspondence to one of the plurality of groups of rows and each receiving the input reference string to be compared, and a block decoder controlled by a counter counting a clock signal and for selecting one of the row decoders in accordance with the count value of the counter so as to bring the selected row decoder into an active condition, the block decoder selecting one of the row groups, and the row decoder selectively brought into the active condition selecting one row of the memory cell matrix belonging to the selected row group and corresponding to the content of the input reference string to be compared, so that the content of the memory cells belonging to the row selected by the row selecting means is read out;

means connected to all the columns of the memory cell matrix, for reading and outputting the content of the memory cells of all the columns belonging to the row selected by the row selecting means; and an encoder, receiving the output of the reading means, for encoding the output to an address for the stored string having substantially the same content as that of the input reference string.

2. A string comparator as claimed in claim 1, wherein the row selecting means comprises a decoder receiving the input reference string to be compared and driving at least one row of the memory cell matrix corresponding to the content of the input reference string.

3. A string comparator as claimed in claim 1 wherein the stored strings are composed of a plurality of characters each having a length of $J \times K$ bits, and wherein the memory cell matrix has a capacity of $2^J \times K \times M$ words by N bits and is divided into $K \times M$ memory blocks each consisting of $2^J$ rows by N columns, so that the each character of the strings is divided into K pieces of J bit data and the K pieces of data are sequentially stored in the same numbered column in the respective memory blocks.

4. A string comparator as claimed in claim 3 wherein each reference string is composed of a plurality of characters each having a length of $J \times K$ bits and each character of the reference string is divided into K pieces of J bit data so that the data pieces of the J bit length are sequentially supplied to the string comparator in response to a clock signal, and wherein the row selecting means is associated with means for counting the clock signal so as to supply to the row selecting means the count output which designates the memory block corresponding to the inputted data piece of the J bit length.

5. A string comparator for searching the address of a stored string having substantially the same content as that of an input reference string, comprising:

memory means, including a number of memory cells arranged in a matrix form having a plurality of rows and a plurality of columns, the rows of the memory means being grouped into a plurality of groups, and one string being written to a portion of one column corresponding to one group of rows such that one of the memory cells belonging to one group of rows in the same column has a predetermined binary value written thereto, so that the column position indicates an address of a string stored in each column and a position of one memory cell written with the predetermined binary value of the memory cells belonging to the same column and to the same row group indicates a content of a string stored in the above mentioned portion of one column corresponding to one row group; and means, coupled to the memory means, and including a plurality of row decoders, each provided in correspondence to one of the plurality of groups of rows and each receiving the input reference string to be compared, and a block decoder controlled by a counter counting a clock signal and for selecting one of the row docoders in accordance with the count value of the counter so as to bring the selected row decoder into an active condition, so that the block decoder selects one of the row groups and the row decoder selectively brought into the active condition selects one row of the memory cell matrix belonging to the selected row group and corresponding to the content of the input reference string to be compared, so that the content of the memory cells belonging to the row selected by the row selecting means is read out;

wherein the stored strings are composed of a plurality of characters each having a length of $J \times K$ bits, and wherein the memory cell matrix has a capacity of $2^J \times K \times M$ words by N bits and is divided into $K \times M$ memory blocks each consisting of $2^J$ rows by N columns, so that the each character of the strings is divided into K pieces of J bit data and the K pieces of data are sequentially stored in the same numbered column in the respective memory blocks;

wherein each reference string is composed of a plurality of characters each having a length of $J \times K$ bits and each character of the reference string is divided into K pieces of J bit data so that the data pieces of the J bit length are sequentially supplied to the string comparator in response to a clock signal, and wherein the row selecting means is associated with means for counting the clock signal so as to supply to the row selecting means the counter output which designates the memory block corresponding to the inputted data piece of the J bit length;

wherein the row selecting means comprises:

a first decoder, receiving the data pieces of the reference string to be compared, for decoding the data pieces to $2^J$ parallel binary signals representing the row position in each memory block corresponding to the content of the received data piece;

a second decoder, receiving the content of the counting means, for decoding the count output to $K \times M$ parallel binary signals representing the memory block corresponding to the count output; and an AND gate array including $2^J \times K \times M$ AND gates which are divided into $K \times M$ groups, each group having $2^J$ AND gates, the AND gates of each group having one input connected to receive the parallel binary signals from the first decoder in one-to-one relation and having their other inputs connected in common to receive the corresponding one binary signal from the second decoder, the outputs of all the AND gates being connected to the corresponding rows of the memory cell matrix in one-to-one relation, so that there is selectively driven one row designated by the first decoder in response to the received data piece of the reference string, in one memory block designated by the second decoder.

6. A string comparator as claimed in claim 5, further comprising:

means, connected to all the columns of the memory cell matrix, for reading and outputting the content of the memory cells of all the columns belonging to the row selected by the row selecting means; and an encoder, receiving the output of the reading means, for encoding the reading means output to an address for the stored string having substantially the same content as that of the input reference string.

7. A string comparator as claimed in claim 6, wherein the reading means comprises:
- an array of N AND gates, each AND gate having one input connected to receive the read-out signal from the corresponding one column of the memory cell matrix;
- an array of N registers, each register receiving and holding the output of the corresponding AND gate for outputting the read-out signal to the encoder; and
- an array of N switches each having a first input connected to the output of the register belonging to the column adjacent to that of the switch, each switch having a second input connected to the output of the register belonging to the same column as that of the switch, and an output of each switch being connected to the other input of the corresponding AND gate, so that the logical product of the sequential read-out signals from each column of the memory cell matrix is obtained by the corresponding AND gate, and then stored in the corresponding register so that it is supplied to the encoder.

8. A string comparator claimed in claim 7 wherein at the beginning of the application of the reference string to the memory means, each register is initialized and each switch is controlled to connect its first input to its output, and thereafter, each switch is maintained in a condition of connecting its second input to its output after until the first memory block to the last memory block are driven by the row selecting means one time.

9. A string comparator for searching the address of a stored string having substantially the same content as that of an input reference string, comprising:
- memory means including a number of memory cells arranged in a matrix form having a plurality of rows and a plurality of columns, the rows of the memory means being grouped into a plurality of groups, and one string being written to a portion of one column corresponding to one group of rows such that of the memory cells belonging to one group of rows in the same column has a predetermined binary value written thereto, so that the column position indicates an address of a string stored in each column and a position for one memory cell written with the predetermined binary value of the memory cells belonging to the same column and to the same row group indicates a content of a string stored in the above mentioned porton of one column corresponding to one row group; and
- means, coupled to the memory means, and including a plurality of row decoders each provided in correspondence to one of the plurality of groups of rows and each receiving the input reference string to be compared, and a block decoder controlled by a counter counting a clock signal and for selecting one of the row decoders in accordance with the count value of the counter so as to bring the selected row decoder into an active condition, so that the block decoder selects one of the row groups and the row decoder selectively brought into the active condition selects one row of the memory cell matrix belonging to the selected row group and corresponding to the content of the input reference string to be compared, so that the content of the memory cells belonging to the row selected by the row selecting means is read out;
- column selecting means for driving in parallel all the columns of the memory cell matrix when the comparator is put in a comparison operation, the column selecting means being responsive to an input address to selectively drive one column of the memory cell matrix corresponding to the input address when the comparator is put in a store operation;
- means for writing the input data in the one column of the memory cell matrix selected by the column selecting means;
- means, connected to all the columns of the memory cell matrix, for reading and outputting the content of the memory cells of all the columns belonging to the row selected by the row selecting means; and
- an encoder, receiving the output of the reading means, for encoding the reading means output to an address for the stored string having substantially the same content as that of the input reference string.

10. A string comparator as claimed in claim 9 wherein the stored strings are composed of a plurality of characters each having a length of $J \times K$ bits, and wherein the memory cell matrix has a capacity of $2^J \times K \times M$ words by N bits and is divided into $K \times M$ memory blocks each consisting of $2^J$ rows by N columns, so that each characer of the strings is divided into K pieces of J bit data and the K pieces of data are sequentially stored in the same numbered column in the respective memory blocks.

11. A string comparator as claimed in claim 10 wherein each reference string is composed of a plurality of characters each having $J \times K$ bits and each character of the reference string is divided into K pieces of J bit data so that the data pieces of the J bit length are sequentially supplied to the string comparator in response to a clock signal, and wherein the row selecting means is associated with means for counting the clock signal so as to supply to the row selecting means the count output which designates the memory block corresponding to the inputted data piece of the J bit length.

12. A string comparator as claimed in claim 11, wherein the row selecting means comprises:
- a first decoder, receiving the data pieces of the reference string to be compared, for decoding the data pieces to $2^J$ parallel binary signals representing the row position in each memory block corresponding to the content of the received data piece;
- a second decoder, receiving the content of the counting means, for decoding the count output to $K \times M$ parallel binary signals representing the memory block corresponding to the count output;
- an OR gate array including $2^J$ OR gates, each OR gate having a first input connected to receive the corresponding one of the decoded signals from the first decoder, respectively, and a second input connected to receive an operation mode signal indicating the store operation or comparison operation; and
- an AND gate array including $2^J \times K \times M$ AND gates which are divided into $K \times M$ groups, each group having $2^J$ AND gates, the AND gates of each group having one input connected to receive the outputs of the corresponding OR gates in one-to-one relation and having their other input connected in common to receive the corresponding one binary signal from the second decoder, the outputs of all the AND gates being connected to the corresponding rows of the memory cell matrix in one-to-one relation, whereby, when the store operation is indicated by the operation mode signal, all the rows of one memory block designated by the second decoder are driven, and when the comparison operation is indicated by the operation mode signal, there is selectively driven one row designated by the first decoder in response to the received data piece of the reference string, in one memory block designated by the second decoder.

13. A string comparator as claimed in claim 12, wherein the reading means comprises:
- an array of N AND gates, each AND gate having one input connected to receive the read-out signal from the corresponding one column of the memory cell matrix;
- an array of N registers, each register receiving and holding the output of the corresponding AND gate for outputting the read-out signal to the encoder; and
- an array of N switches each having a first input connected to the output of the register belonging to the column adjacent to that of the switch, each switch having a second input connected to the output of the register belonging to the same column as that of the switch, and an output of each switch being connected to the other input of the corresponding AND gate, so that the logical product of the sequential read-out signals from each column of the memory cell matrix is obtained by the corresponding AND gate, and then stored in the corresponding register so that it is supplied to the encoder.

14. A string comparator as claimed in claim 13, wherein at the beginning of the application of the reference string to the memory means, each register is initialized and each switch is controlled to connect its first input to its output, and thereafter, each switch is maintained in a condition of connecting its second input to its output until the first memory block to the last memory block are driven by the row selecting means one time.

15. A string comparator as claimed in claim 13, wherein
- only one of the binary signals outputted from the first decoder corresponding to the row position of the memory cell matrix designated by the input reference data is "1", while the other binary signals are "0";
- only one of the binary signals outputted from the second decoder corresponding to the designated memory block is "1", while the other binary signals are "0"; and
- the operation mode signal is "1" when the store operation is ordered, and "0" when the comparison operation is ordered.

16. A string comparator as claimed in claim 13, wherein the column selecting means comprises a decoder, receiving the input address, for selectively driving one column of the memory cell matrix which corresponds to the input address.

17. A string comparator as claimed in claim 13, wherein the column selecting means comprises:
- a decoder receiving the input address to be stored and decoding the data to N parallel binary signals representing the column position of the memory cell matrix corresponding to the content of the input data; and
- N OR gates each having a first input connected to receive the corresponding one of the parallel binary signals and a second input connected in common to receive an inverted mode signal, the outputs of all the OR gates being connected to the corresponding columns of the memory cell matrix, whereby, when the store operation is ordered, one column of the memory cell matrix designated by the input address is selectively driven; and
- when the comparison operation is ordered, all columns of the memory cell matrix of the memory means are driven.

18. A string comparator as claimed in claim 13, wherein the data writing means comprises:
- a decoder receiving the input data to be stored for generating parallel binary signals of $2^J$ bits, each of these binary signals being supplied to the same numbered row of all the memory blocks.

19. A string comparator as claimed in claim 13, wherein the data writing means comprises:
- a decoder receiving the input data to be stored for generating parallel binary signals; and
- an array of $2^J$ flip-flops, each flip-flop having a set input receiving the corresponding one of the parallel binary signals from the decoder and having a reset input receiving a clear signal, an output of each flip-flop being connected to the same numbered row of the all the memory blocks.

20. A string comparator as claimed in claim 19, wherein only one of the parallel binary signals outputted from the data writing means to the row of the memory cell matrix designated to the content of the input data to be stored is "1", while the other binary signals are "0".

21. A string comparator as claimed in claim 13, wherein the memory means further includes an indicator section associated to all the columns of the memory cell matrix for indicating whether or not the associated column stores any string, the indicator section being driven by the row selecting means in response to another operation mode signal, and also written by the second operation mode signal.

22. A string comparator as claimed in claim 21, further including an array of EXCLUSIVE-OR gates, each having a first input connected to the corresponding one column of the memory cell matrix, and a second input connected to receive a control signal, an output of each EXCLUSIVE-OR gate being connected to the one input of the corresponding AND gate.

23. A string comparator for searching the address of a stored string having substantially the same content as that of an input reference string, each string composed of a plurality of characters, each having a length of $J \times K$ bits, the string comparator comprising:
- memory means, including a store part composed of memory cells arranged in a matrix form of $2^J \times K \times M$ rows by N columns and an indicator part arranged in one row by N columns, for indicating the occupation of each column of the memory cell matrix, the rows of the memory means being grouped into a plurality of groups, and one string being written to a portion of one column corresponding to one group of rows such that one of the memory cells belonging to one group of rows in the same column has a predetermined binary value written thereto, so that the column position indicates an address of a string stored in each column and a position of one memory cell written with the predetermined binary value of the memory cells belonging to the same column and to the same row group indicates a content of a string stored in the above mentioned portion of one column corresponding to one row group;

means, coupled to the memory means and including a plurality of row decoders each provided in correspondence to one of the plurality of groups of rows and each receiving the input reference string to be compared, and a block decoder controlled by a counter counting a clock signal and for selecting one of the row decoders in accordance with the count value of the counter so as to bring the selected row decoder into an active condition, so that the block decoder selects one of the row groups and the row decoder selectively brought into the active condition selects one row of the memory cell matrix belonging to the selected row group and corresponding to the input reference string to be searched;

reading means for reading the content of the memory cells belonging to the row selected by the row selecting means and outputting the content of the memory cells of the column of the selected row; and an encoder receiving the output of the reading means and encoding the content of the memory cells of the column in the selected row respectively to the addresses for the input reference string to be searched.

24. A string comparator as claimed in claim 23, further comprising:

means connected to all the columns of the memory cell matrix for reading and outputting the content of the memory cells of all the columns belonging to the row selected by the row selecting means; and an encoder receiving the output of the reading means and for encoding it to an address for the stored string having substantially the same content as that of the input reference string.

25. A string comparator as claimed in claim 23, wherein the memory cell matrix with $2^J \times K \times M$ words by N bits is divided into $K \times M$ memory blocks, so that the input data having the length of $J \times K$ bits is divided into K pieces of J bit data and the K pieces of data are sequentially stored in the same numbered column in the respective memory block by cooperation of the row selecting means and the data writing means.

26. A string comparator as claimed in claim 23, wherein the reading means comprises:

an array of N EXCLUSIVE-OR gates, each EXCLUSIVE-OR gate having a first input connected to the corresponding one column of the memory cell matrix so as to receive the read-out output and a second input receiving an inverted operation signal:

an array of N AND gates, each AND gate having one input connected to receive the output from the corresponding EXCLUSIVE-OR gate;

an array of N switches each having a first input connected to the output of the register belonging to the column adjacent to that of the switch, each switch having a second input connected to the output of the register belonging to the same column as that of the switch, and an output of each switch being connected to the other input of the corresponding AND gate, so that the logical product of the sequential read-out signals from each column of the memory cell matrix is obtained by the corresponding AND gate, and then stored in the corresponding register so that it is supplied to the encoder.

27. A string comparator claimed in claim 26 wherein at the beginning of the application of the reference string to the memory means, each register is initialized and each switch is controlled to connect its first input to its output, and thereafter, each switch is maintained in a condition of connecting its second input to its output after until the first memory block to the last memory block are driven by the row selecting means one time.

28. A string comparator as claimed in claim 26, wherein operation modes are controlled by the logical value of the first operation mode signal (M1), the second operation mode signal (M2) and the inverse operation signal (I), if denoted as (M1, M2, I), as:

(0, 0, 0) for comparison operation;

(0, 1, X) for deletion operation;

(1, 0, 1) for read-out operation of the content of the indicator part;

(1, 1, 0) for store operation of strings;

where the "X" is "1" or "0".

29. A string comparator as claimed in claim 28, wherein when the store operation is ordered, "1" is stored in the column of the indicating means designated by the registration address.

30. A string comparator as claimed in claim 28, wherein when the deletion operation is ordered, "1" is stored in the column of the indicating means if the input data is stored in the same column number of the memory part; while "0" is stored otherwise.

31. A string comparator as claimed in claim 28, wherein when the read-out operation is ordered, "1" is outputted from the encoder if there are empty columns, while "0" is outputted otherwise.

32. A string comparator as claimed in claim 28, wherein when the comparison operation is ordered, "1" is outputted from the encoder when the reference data is identical with the stored data, while "0" is outputted otherwise.

33. A string comparator for searching the address of an stored string having substantially the same content as that of an input reference string, each string composed of a plurality of characters, each having a length of $J \times K$ bits, the string comparator comprising:

memory means including a store part composed of memory cells arranged in a matrix form of $2^J \times K \times M$ rows by N columns and an indicator part arranged in one row by N columns for indicating the occupation of each column of the memory cell matrix, the rows of the memory means being grouped into a plurality of groups, and one string being written to a portion of one column corresponding to one group of rows such that one of the memory cells belonging to one group of rows in the same column has a predetermined binary value written thereto, so that the column position indicates an address of a string stored in each column and a position of one memory cell written with the predetermined binary value of the memory cells belonging to the same column and to the same row group indicates a content of a string stored in the above mentioned portion of one column corresponding to one row group;

means, coupled to the memory means and including a plurality of row decoders each provided in correspondence to one of the plurality of groups of rows and each receiving the input reference string to be compared, and a block decoder controlled by a counter counting a clock signal and for selecting one of the row decoders in accordance with the count value of the counter so as to bring the selected row decoder into an active condition, so that the block decoder selects one of the row groups and the row decoder selectively brought into the active condition selects one row of the memory cell matrix belonging to the selected row group and corresponding to the input reference string to be searched;

reading means for reading the content of the memory cells belonging to the row selected by the row selecting means and outputting the content of the memory cells of the column of the selected row; and an encoder receiving the output of the reading means and encoding the content of the memory cells of the column in the selected row respectively to the addresses for the input reference string to be searched, wherein the row selecting means comprises:

a first decoder receiving input data to be compared or stored and decoding the data to signals corresponding to the row of the memory cell matrix and representing the row position of the memory cell matrix corresponding to the content of the input data;

a second decoder receiving the content of the counter and decoding the content to signals corresponding to the row of the memory cell matrix and representing the row position of the memory cell matrix corresponding to the content;

an OR gate array of $2^J$ OR gates, each OR gate having a first input receiving the corresponding one of the decoded signals from the first decoder and a second input receiving an operation made signal indicating the store operation or comparison operation; and an AND gate array of $2^J \times K \times M$ AND gates, each AND gate receiving respectively one of the decoded signals from the decoder and the output of the corresponding OR gate in the OR gate array;

an EXCLUSIVE-OR gate receiving two operation mode signals and outputting a signal to the enable input of both the first and the second decoders;

an AND gate receiving the same two operation mode signals and outputting a signal to the second inputs of all the OR gates in the OR gate array; and an OR gate receiving the same two operational mode signals and outputting a signal to drive the line connected to the indicator part.

* * * * *

UNITED STATES PATENT AND TRADEMARK OFFICE
CERTIFICATE OF CORRECTION

PATENT NO. : 4,907,194

DATED : March 6, 1990

INVENTOR(S) : Hachiro Yamada et al.

It is certified that error appears in the above-identified patent and that said Letters Patent is hereby corrected as shown below:

Column 11, line 54, delete "areapplied" and insert --are applied--.

Column 15, line 41, delete "system" and insert --systems--.

Column 17, line 68, delete "docoders" and insert --decoders--.

Signed and Sealed this

Nineteenth Day of November, 1991

Attest:

HARRY F. MANBECK, JR.

*Attesting Officer*　　　　*Commissioner of Patents and Trademarks*